(12) United States Patent
Giartosio et al.

(10) Patent No.: US 9,726,888 B2
(45) Date of Patent: Aug. 8, 2017

(54) AUGMENTED REALITY GLASSES

(71) Applicant: GLASSUP S.R.L. A CAPITALE RIDOTTO, Modena (IT)

(72) Inventors: Francesco Giartosio, Modena (IT); Giovanni Tregnaghi, Brescia (IT)

(73) Assignee: GLASSUP S.R.L., Modena (IT)

( * ) Notice: Subject to any disclaimer, the term of this patent is extended or adjusted under 35 U.S.C. 154(b) by 0 days.

(21) Appl. No.: 14/439,595

(22) PCT Filed: Oct. 29, 2013

(86) PCT No.: PCT/IB2013/059755
§ 371 (c)(1),
(2) Date: Apr. 29, 2015

(87) PCT Pub. No.: WO2014/068482
PCT Pub. Date: May 8, 2014

(65) Prior Publication Data
US 2015/0286055 A1    Oct. 8, 2015

(30) Foreign Application Priority Data

Oct. 30, 2012 (IT) .............................. MI2012A1842

(51) Int. Cl.
*G02B 27/01* (2006.01)
*G06F 3/01* (2006.01)
*G06T 19/00* (2011.01)

(52) U.S. Cl.
CPC ..... *G02B 27/0172* (2013.01); *G02B 27/0176* (2013.01); *G06F 3/012* (2013.01); *G06T 19/006* (2013.01); *G02B 2027/014* (2013.01); *G02B 2027/0118* (2013.01); *G02B 2027/0123* (2013.01); *G02B 2027/0152* (2013.01); *G02B 2027/0178* (2013.01)

(58) Field of Classification Search
None
See application file for complete search history.

(56) References Cited

U.S. PATENT DOCUMENTS

| 4,740,780 A * | 4/1988 | Brown ................... G02B 27/01 345/7 |
| 2002/0085175 A1* | 7/2002 | Butler .................. G02B 27/017 351/221 |
| 2005/0275714 A1 | 12/2005 | Ishikawa et al. |
| 2008/0218434 A1 | 9/2008 | Kelly et al. |

(Continued)

FOREIGN PATENT DOCUMENTS

| GB | 2 447 564 A | 9/2008 |
| WO | 2012/132289 A1 | 10/2012 |

*Primary Examiner* — Nicholas Lee
(74) *Attorney, Agent, or Firm* — Pearne & Gordon LLP (57) ABSTRACT

The invention describes augmented reality glasses comprising a frame which supports a glasses lens, wherein associated with the frame are a miniaturized display configured for emitting images in a predetermined direction, an optical system configured for receiving the images coming from the display and creating processed images, and reflection means configured for receiving the processed images and reflecting them towards the glasses lens, so as to project the processed image onto this lens, wherein this lens is configured for reflecting the projected image in a direction of the ocular axis.

12 Claims, 5 Drawing Sheets

(56) References Cited

U.S. PATENT DOCUMENTS

| | | | |
|---|---|---|---|
| 2010/0033830 A1* | 2/2010 | Yung | G02B 3/00 |
| | | | 359/630 |
| 2013/0050070 A1* | 2/2013 | Lewis | A61B 3/113 |
| | | | 345/156 |
| 2013/0100511 A1 | 4/2013 | Yamamoto et al. | |
| 2013/0113973 A1* | 5/2013 | Miao | G09G 3/003 |
| | | | 348/333.01 |

* cited by examiner

AUGMENTED REALITY GLASSES

FIELD OF APPLICATION

The object of the present invention is augmented reality glasses.

In particular, the object of the present invention is augmented reality glasses capable of superimposing information or images on the field of vision, without replacing it.

KNOWN ART

Glasses are known of various types linked to different uses; the known traditional glasses allow a view only of the scene surrounding the observer who is wearing them.

Known, but less used, are glasses which make it possible to observe images precluding the view of the scene surrounding the observer.

Augmented reality glasses, however, are beginning to slowly spread which allow a view of the surrounding scene, superimposing information or images thereon.

This last technology allows the user to observe the surrounding scene and to perform the habitual actions of life, such as walking or driving a car, while simultaneously receiving multimedia information.

In other words, these augmented reality glasses allow the person wearing them to receive information without diverting their eyes, and therefore their attention, from the surrounding scene.

Augmented reality glasses are known for dedicated applications, typically sporting, such as, for example:

- calculating and projecting onto the visor certain parameters useful in the sporting field by means of GPS monitoring and pressure data which make it possible to project onto a display such data as the speed with which one is moving, the distance travelled, one's altitude, even compared with the summit of a mountain or the bottom of a valley;
- receiving and reading SMS messages on the display and knowing when an incoming telephone call is received on a smartphone.

Among the augmented reality glasses actually made hitherto solely as prototypes there are pseudo-glasses, not equipped with lenses, provided with an external projector mounted on the temple of the glasses, with which the images are projected into the eye.

Among the studies and prototypes proposed, there are also others which make it possible to record the images which the eye sees through the glasses by means of a video camera mounted on the frame, to transmit the images and to store them in an external unit, making it possible at a later time to access everything that has been seen during the day.

Other technological solutions which for now are at the proposal stage regard the use of a display in place of the glasses lens which make it possible to see both images created on the display and the external reality; these are glasses with an opto-electronic part in place of the glasses lenses.

Other solutions which have also been proposed are holographic displays, again in place of the glasses lens.

The technologies which have been summarily described present numerous and serious disadvantages.

A first disadvantage concerns augmented reality glasses which support external opto-electronic parts installed on them, such as a projector located at the side of the eye or a display replacing the glasses lenses; glasses made in this way are necessarily of considerable dimensions and weight which preclude their continuous use, while the very idea of augmented reality glasses is to be worn for a long time or even all day to make it possible to increase and optimise one's possibilities for action by means of the multimedia information projected into the eye in all kinds of activity, both work and leisure.

A second disadvantage concerns the luminosity of the display whose images are projected into the eye of the user, who will thus see the optical information from the display superimposed on the external image. The luminosity of the display is fixed, with the result that in certain light conditions, for example in sunlight, the projected image is no longer visible because it cannot have a level of luminous intensity comparable with the light from the outside.

A third disadvantage concerns the energy consumption typical of this type of object. The batteries are portable and must be integrated into the temple of the glasses. The consumption of the electronic components of the glasses precludes continuous use of the glasses for the entire day.

A fourth disadvantage is that for some augmented reality glasses hitherto proposed, the optical information from the display comes from the outer side or from the bottom of the field of vision; for example in some models a projector attached to the side-piece of the glasses projects the image to the side of the glasses from the outside, or other models project the image downwards onto the lens of the glasses.

This forces the user to turn their pupils upwards and outwards or downwards, with a consequent loss of partial view of the surrounding scene.

Since augmented reality glasses are created to allow multimedia interactivity without the user diverting their visual attention from the surrounding scene, having the pupils rotated upwards and outwards or downwards goes against the very significance of this type of technology.

In fact, the obligation to turn the pupils upwards and outwards or downwards makes it no longer possible to perform some of the normal activities of life such as driving a car, because with the pupils rotated outwards to see the projected information, one risks ending up off the road, or when walking one risks not seeing a signpost right in front of one and colliding with it, nor does it permit one to carry on work activities such as writing on a computer keyboard or performing particular tasks where the visual attention must be concentrated on the hands.

A fifth disadvantage is the presence in the user's field of vision of external projection systems which project into the eye and which, consequently, limit the view of the surrounding scene; this, too, goes against the principal significance for which augmented reality glasses were conceived, i.e. to allow the user to receive information directly in the eye, while continuing, however to observe the scene in its completeness.

The typical contraindication for the person wearing them is not to see an object at the side of the eye while performing a usual activity such as driving a car, and not being aware of the arrival of a vehicle from a side road; in general such glasses are contraindicated in all those activities where even a peripheral view of the surrounding scene is necessary.

A sixth disadvantage of some models of augmented reality glasses hitherto proposed concerns the reflections of the scene behind the back of the user, due to the reflective coating deposited on the inner side of the glasses lens for the purpose of carrying the image from the micro-display into the eye. It can be annoying for the user to see projected onto the glasses the scene which is taking place behind their back, and it can also become dangerous when driving if a car comes from behind with strong lights such as main-beam headlamps switched on.

A seventh disadvantage of the models of augmented reality glasses hitherto proposed concerns the impossibility of the use of this type of glasses by people who habitually wear optical glasses.

The single case of a satisfactory solution concerns the external projector of the display image, which can project the display image into the eye through the optical lens; this type of solution, however, presents a series of contraindications described above. No solution is currently possible if the lenses are replaced by a display and no satisfactory solution has hitherto been proposed to the problem in the case of the use for augmented reality glasses of special glasses lenses in general with reflective surface coating on the inner part of the glasses lens; in this case the optical beams from the display do not pass through the optical lens because they are reflected by the inner surface of the glasses lens, i.e. the surface facing towards the eye. In this case in fact the user would see the image from the display out of focus.

Document GB 2 447 564 describes a display device comprising a support structure with a face carrying a lens, a pair of temples connected to the face, a display device with LCD output supported by at least one of the temples, wherein the display device has a display face which in use faces downwards, a first reflector 28 supported by the associated temple and situated below the display device, and a second reflector 18 associated with the lens 14.

More specifically, this device provides a frame wherein the temples are of a relatively large thickness and adjacent to the face which supports the lens, wherein the inner surfaces of the temples are shaped so as to conform to the curvature of the user's face.

Furthermore, the inner surface of the lenses in proximity to the edges is provided with a coating of material which reflects light; this material is provided not immediately in front of the eyes of the person wearing the glasses so that the forward vision of the wearer is not affected by the presence of the coating and of the image displayed.

Lastly, this device does not provide any image processing because it provides only reflecting elements, in particular first and mirror elements.

The known art document described gathers together a plurality of the disadvantages of the known art already demonstrated.

In the light of all the disadvantages demonstrated, an object of the present invention is to provide augmented reality glasses which resolve some of the problems set forth above.

A particular object is to provide augmented reality glasses of simple construction, as close as possible to the structure of traditional glasses.

Another object is to provide augmented reality glasses that are simple to use.

A further object is to provide augmented reality glasses with high visual efficiency.

SUMMARY OF THE INVENTION

These and other objects are achieved by augmented reality glasses according to the description given in the attached claims.

The invention, as described, achieves the following technical effects:

- it creates augmented reality glasses as close as possible to traditional glasses, i.e. without visible opto-electronic parts and, therefore, ideal in all the normal configurations and activities of life;
- it increases the possibilities of perception of reality, making it possible, according to the various degrees of complexity and embodiments opted for, to access:
   - the surrounding scene which is observed through the glasses,
   - but also written and drawn multimedia content such as SMS messages, emails, address book entries, timetable, route-finding, driving data, mechanical and electronic diagrams and so forth,
   - or to access real image content such as photographs, video clips, internet and, always depending on the degree of complexity of the model of glasses made, to listen/speak in telephonic conversation, to listen to music and so forth;
- it also makes it possible to perform several actions simultaneously, and thus amplify the user's possibility of action especially when on the move; for example, it will allow the user to walk and read the navigation system map which is projected into the eye, to drive the car and simultaneously read the car driving data, to sit on a train and watch a film, to write and send SMS and email messages when walking, and to answer a telephone call and speak while driving a car, without diverting one's attention from the road (therefore with a system not necessarily integrated with the car's controls).

The technical effects mentioned and other technical effects will emerge in more detail from the description, given below, of an embodiment shown by way of non-limiting example with reference to the attached drawings.

DETAILED DESCRIPTION OF THE INVENTION

The invention describes augmented reality glasses comprising a frame which supports a glasses lens, wherein associated with the frame are a miniaturised display configured for emitting images in a predetermined direction, an optical system configured for receiving the images from the display and creating processed images, and reflection means configured for receiving the processed images and reflecting them towards at least one glasses lens, so as to project the processed images onto this lens, wherein this lens is configured for reflecting the projected image in an ocular direction.

Figure 1:
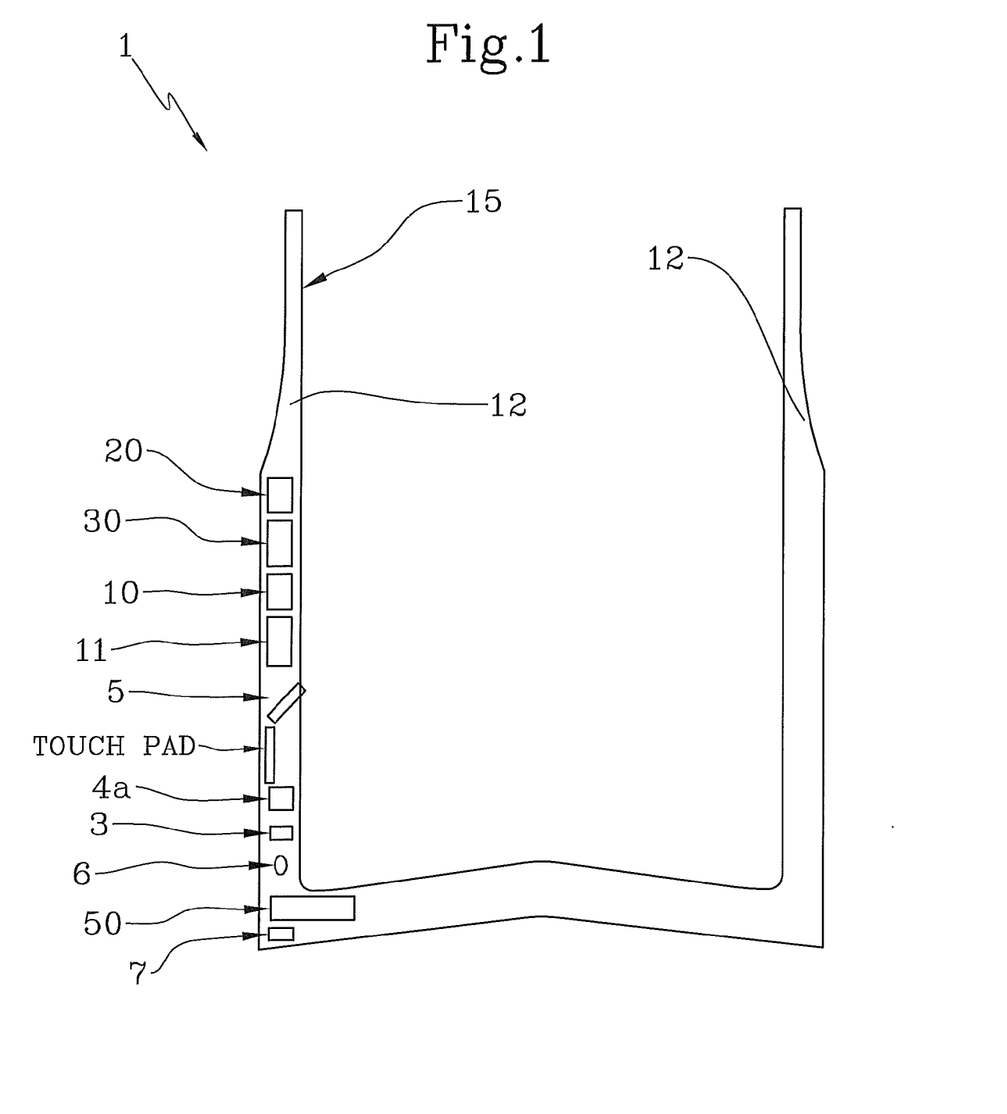
FIG. 1 shows an overall view of the augmented reality glasses of the invention.
Figure 2:
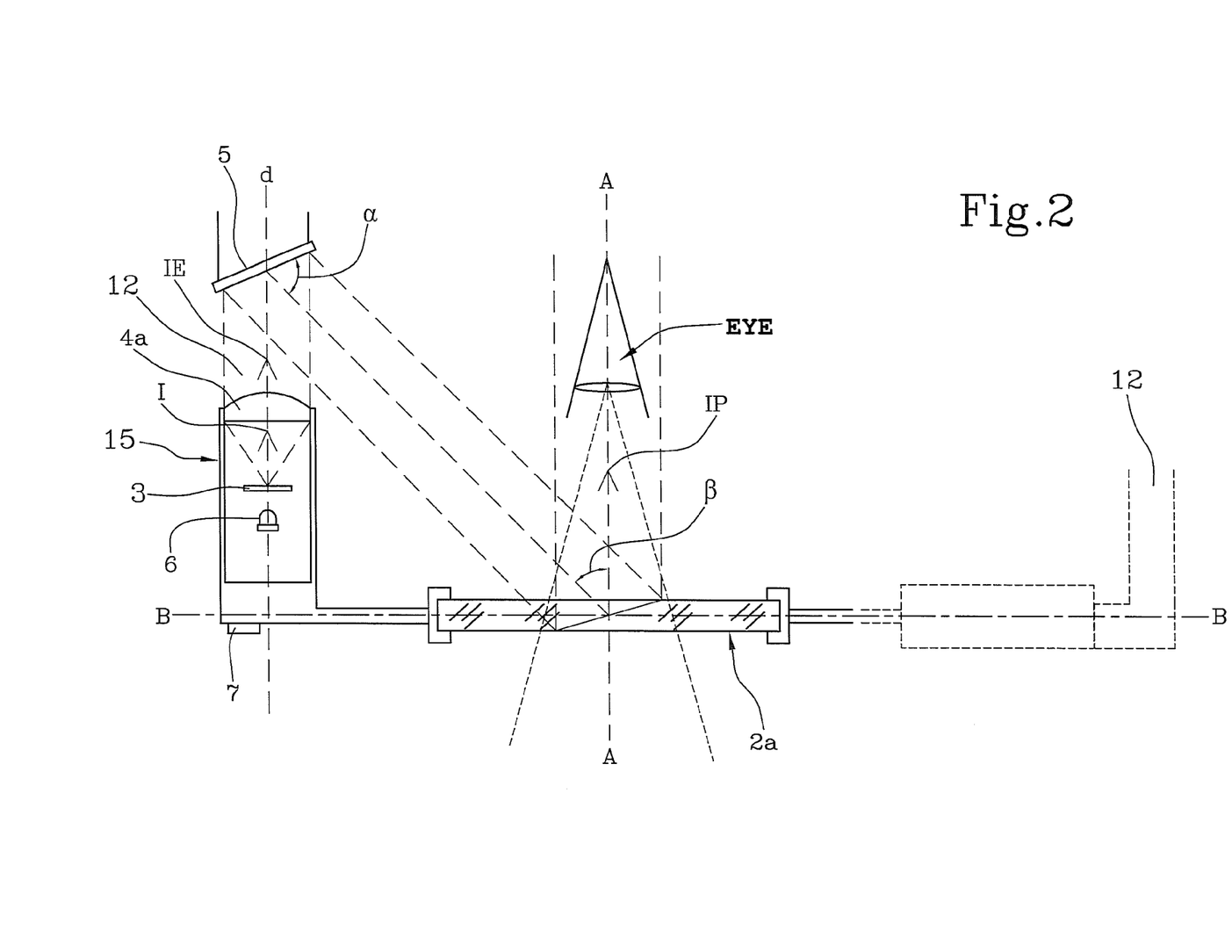
FIG. 2 shows a detail of the glasses of FIG. 1.

With particular reference to FIGS. 1 and 2, the augmented reality glasses 1 comprise a frame 15 which supports a glasses lens 2*a*, 2*b*.

The frame is completed by two temples 12 supporting the glasses.

According to the invention, the frame 15 has associated with it a miniaturised display 3.

Preferably, the miniaturised display 3 is mounted in this frame 15.

According to the invention, the miniaturised display 3 is configured for emitting images I in a direction d away from a plane B-B (FIG. 2) comprising the longitudinal extension of the glasses lens 2a, 2b.

In other words, the miniaturised display 3 is configured for emitting images I in a direction d away from the glasses lenses 2a, 2b, wherein the direction d substantially coincides with the directrix of a supporting temple 12 in the prevalent direction of extension of the supporting temple 12, as shown by the arrows in FIG. 2.

Otherwise stated, the sense of the prevalent extension of the supporting temple 12 is that which goes towards the ear of the user of the glasses.

Preferably, again with reference to FIG. 2, the miniaturised display 3 is configured for emitting images I in a direction d away from the glasses lenses 2a, 2b so that these images are transmitted in the direction d of the directrix of a supporting temple 12 for the frame 15, wherein this direction d lies in a plane substantially perpendicular to the plane B-B comprising the longitudinal extension of the glasses lens 2a, 2b.

Preferably, the display 3 is a liquid crystal display, in particular with active matrix.

In one embodiment of the invention, the display 3 is a transmissive display.

In other words, the display transmits part of the light with which it is illuminated.

In particular, the transmissive display 3 is a back-lit display.

In this embodiment, the glasses 1 comprise at least one LED 6 configured for back-lighting the display 3.

In another embodiment of the invention, alternative or additional to the previous, the display 3 is a reflection display, described in detail below.

According to the invention, the frame 15 has further associated with it an optical system 4a, 4b.

Preferably, the optical system 4a, 4b is arranged in this frame 15.

According to the invention, the optical system 4a, 4b comprises at least one lens.

In particular, the optical system 4a can comprise one or more lenses according to the particular functionality of the augmented reality glasses 1 manufactured.

The optical system 4a, 4b is configured for receiving images I from the display 3.

The optical system 4a, 4b is configured for processing the images I so as to create processed images IE.

More precisely, the optical system 4a, 4b is configured for collimating and enlarging the images I so as to create processed images IE.

The optical system 4a, 4b is further configured for addressing these processed images IE away from the glasses lenses 2a, 2b.

In other words, the optical system 4a, 4b is configured for addressing these processed images IE in a direction d away from a plane B-B comprising the longitudinal extension of the glasses lens 2a, 2b.

In particular, the direction d coincides with the direction of emission of the images by the miniaturised display 3.

According to the invention, the frame 15 has associated with it reflection means 5, in particular comprising mirrors.

Preferably the reflection means 5 are arranged in this frame 15.

According to the invention, the reflection means 5 are configured for receiving the processed images IE and reflecting them at a first predefined angle α (FIG. 2) towards the glasses lens 2a, 2b.

In particular, these reflection means 5 are configured for projecting the processed image IE towards the glasses lens 2a, 2b.

Yet more particularly, the reflected images generate a projected image IP on the glasses lens 2a, 2b.

According to the invention, the lens 2a, 2b is configured for reflecting the projected image IP in a direction of the ocular axis A-A according to a second predefined angle β with respect to the direction of incidence of the processed images (IE) onto the glasses lens (2a, b).

According to the description above, the glasses 1 of the invention are configured in such a way that the image which is formed on the display 3 is collected by the optical system 4a, 4b for collimating the light and then conveyed onto a mirror 5 which will reflect it towards the lens; this lens will reflect the image towards the eye of the user.

The glasses 1 of the invention comprise furthermore a processing unit 10 configured for processing input data to the glasses 1 to generate corresponding images I on the display 3.

In general, it should be noted that in the present context and in the subsequent claims, the processing unit 10 is presented as being divided into distinct functional modules (storage modules and operative modules) for the sole purpose of describing clearly and completely the functionalities of the processing unit 10 itself.

In reality this processing unit 10 can consist of a single electronic device (or card), appropriately programmed to perform the functionalities described, and the different modules can correspond to hardware entities and/or routine software forming part of the programmed device.

As an alternative or in addition, such functionalities can be performed by a plurality of electronic devices on which the aforementioned functional modules can be distributed.

The processing unit 10 can also make use of one or more processors for executing the instructions contained in the storage modules.

According to the invention, the glasses 1 comprise a luminosity sensor 7 configured for measuring values of luminous intensity A for the surrounding environment.

Preferably, this sensor 7 is associated with the frame 15.

Preferably, this sensor 7 is mounted in the frame 15 so as to be able to measure the luminosity conditions frontally with respect to the glasses.

In a first variant of the invention, the display 3 and the luminosity sensor 7 are mounted at the end of the temple 12 towards the lens 2a, 2b and the display 3 emits in a direction d contrary with respect to the glasses lens 2a, i.e. it emits in the direction of the ear.

In other words, the display 3 emits in the direction d away from the plane B-B comprising the longitudinal extension of the glasses lens 2a, 2b.

A first technical effect achieved is the exploitation of the only free volume between the glasses 1 and the user's head, i.e. the volume between the end of the temple 12 towards the glasses lens 2a, 2b and the head itself.

A second technical effect achieved is to hide the largest-sized electronic part, i.e. the display, and the optical system in the only free space between the frame and the user's head.

The solution created lies in the idea of making an object of modest dimensions and as close as possible to a classical pair of glasses, therefore not of large dimensions and without visible electronic components, so as to allow use in the usual contexts of life where it is unlikely that glasses that were of too large dimensions or with visible electronic components would be accepted.

Figure 1A:
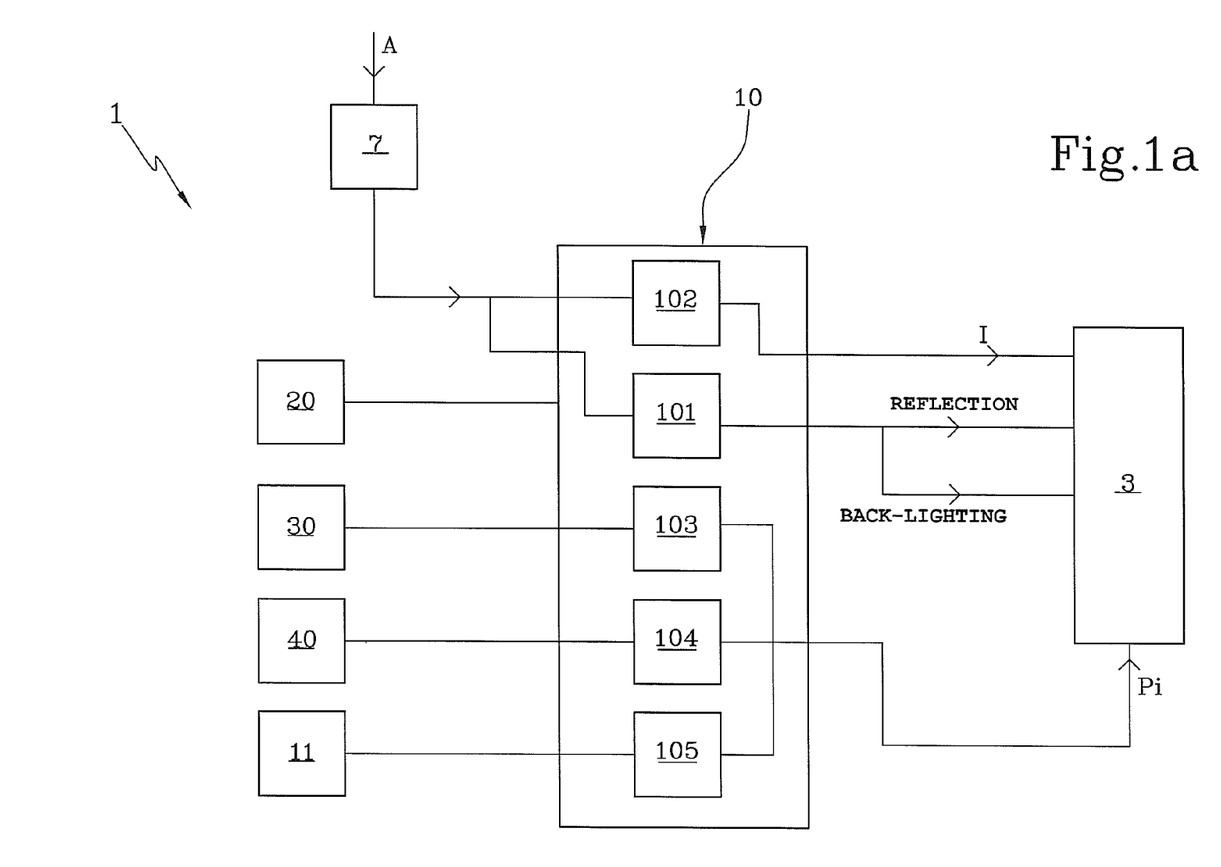
FIG. 1*a* shows a schematic view in terms of a block diagram of the glasses of FIG. 1.

In a second variant of the invention, the processing unit 10 comprises an adjustment module 102 (FIG. 1*a*).

The adjustment module 102 is configured for producing an image I for the display 3 depending on the luminous intensity A measured by the luminosity sensor 7.

The technical effect achieved is the adjustment of the luminous intensity of the illumination system, in particular the at least one LED 6, of the display 3, depending on the external light.

In more detail, an illumination sensor 7 located in the temple 12 of the glasses 1 will constantly produce the data on the ambient luminous intensity.

Advantageously, according to the invention, this data will be transmitted to the processing unit 10 which will be responsible for varying the intensity of the at least one LED 6, i.e. of the illumination system of the display 3.

The technical effect achieved is the production of an image which will be projected into the eye of the user with a luminous intensity proportional to the luminous intensity of the surrounding scene observed by the user of the glasses 1, so as to maintain a correct contrast between projected image IP and ambient light.

Advantageously, according to the invention, the user will always clearly see the image IE coming from the display 3 and superimposed on the image of the surrounding scene, without having to strain or fatigue the eye or to be dazzled thereby.

Advantageously, according to the invention, the user will be able to observe the superimposed image from the display 3 without having to apply external filters to the lenses 2*a*, 2*b* of the glasses 1, as occurs, by contrast, in the known systems for reducing the light from the external scene, if it is too strong, as can be the case during use in intense daytime luminosity.

Advantageously, according to the invention, the user will not be dazzled by the superimposed image from the display 3 in the case of low luminosity, for example at night.

In a third variant of the invention, as already mentioned, the display 3 is a reflection display.

This display 3 has the particular property of being able to be read even in sunlight because it does not operate with a back-lighting system which must compete with the light of the sun but exploits the sunlight itself which is reflected by the display 3.

Figure 4:
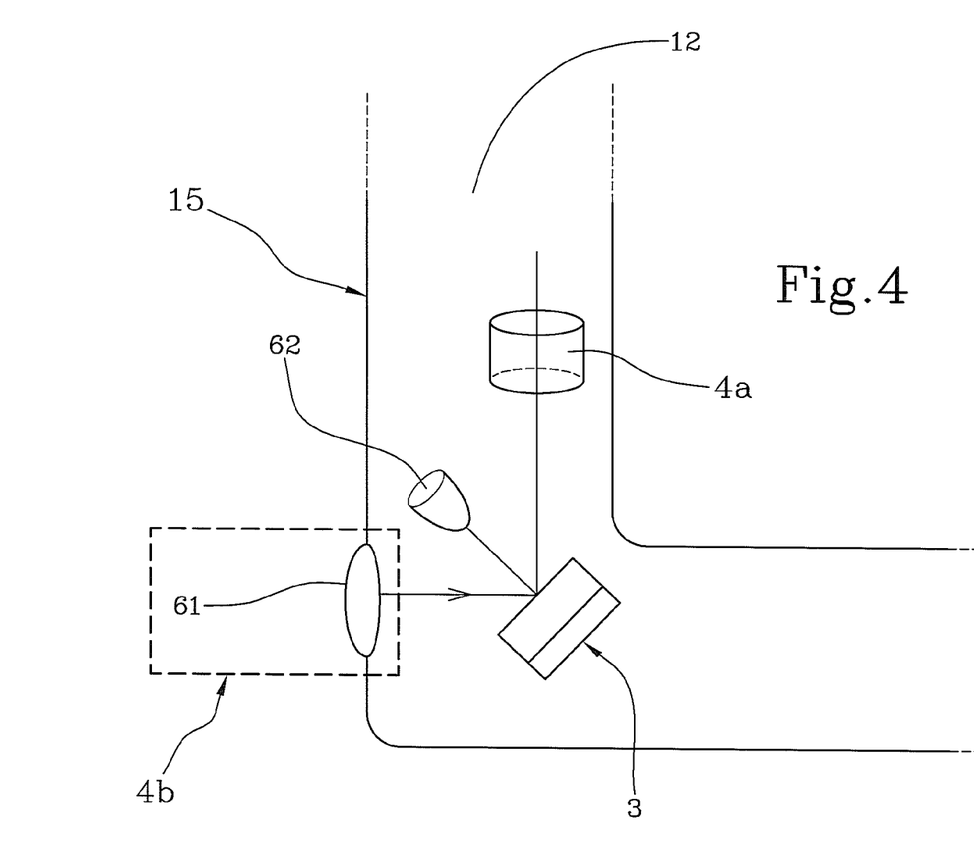
FIG. 4 shows a detail of the glasses of FIG. 1.

According to the invention, the glasses 1 comprise an optical system 4*b* (FIG. 4). The optical system 4*b* is configured for concentrating solar rays on the display 3, in particular by means of the auxiliary lens 61.

The optical system 4*b* and the auxiliary LED 62 are furthermore configured for illuminating the display 3.

In other words, the optical system 4*b* is a concentrator of solar rays which will collect the external light and project it onto the display 3.

The image reflected by the display 3 will then be collected by the collimating system and the image will follow the optical path, previously described in the case of the back-lit display 3, to then be projected into the eye of the user.

This technological solution makes it possible during the day to project images into the eye without using an illumination system for the display 3, by simply exploiting the sunlight through the auxiliary lens 61.

Considering that the illumination system of the display 3 has an energy consumption far higher than the other electronic components of augmented reality glasses, the energy saving is high and so there is a considerable increase in the battery life, which represents one of the most important problems for this type of device.

A technical effect of the described solution is the use of sunlight as a light source, which occurs precisely when the greatest expenditure of energy would be needed for adapting the luminosity of the display 3 to the external luminosity.

Alternatively or in addition, the illumination system for the display 3, which includes the auxiliary LED 62, is activated by the processing unit 10 by means of the data provided by the illumination sensor 7, preferably in conditions of low luminosity in the evening, at night or when passing through a tunnel etc.

Although the preferable type of operation is alternation between LED illumination in the evening and at night, and solar illumination during the daytime via the auxiliary lens by means of the optical system 4*b*, the display 3 can also operate supplied by an LED illumination light wherein the power of the LED is also varied in the presence of available solar light.

In low external light conditions, however, the light intensity necessary for illuminating the display 3 is very low and therefore the battery life remains considerable.

Advantageously, according to the invention, the processing unit 10 comprises a selection module 101 configured for selecting the display mode of the display 3 as a function of the luminous intensity A so as to produce an image I for the display 3 as a function of the luminous intensity A.

A fifth variant requires the lens 2*a*, 2*b* of the glasses 1 to be made so as to reflect the image IE coming from the display 3 so that the centre of this image is at the centre of the lens 2*a*, 2*b* of the glasses and is reflected along the ocular axis A-A, and therefore the eye can perceive it at the centre of the observed scene (see FIG. 2).

As is well known, the term "ocular axis" (or optic axis) is understood to mean the line which connects the front and rear poles of the eye.

More specifically it means a line which connects the centre of the anterior curvature of the cornea (anterior pole) with the centre of the posterior curvature of the sclera (posterior pole).

Clear reference can also be found online at http://medical-dictionary.thefreedictionary.com/optic+axis. It may be deduced from this that the ocular axis A-A as described determines a unique direction with respect to the user's eye.

The reflection occurs at a second predefined angle β with respect to the direction of projection of the image onto the lens 2*a*.

In other words, the reflection means 5 are configured for reflecting the processed image IE towards the glasses lens (2*a*, 2*b*) so that the image IP projected onto the glasses lens (2*a*, 2*b*) is reflected according to the ocular axis A-A.

In yet other words, the reflection means 5 are configured for reflecting the image IE towards the glasses lens 2*a*, 2*b* so that the centre of the projected image IP is in the centre of the glasses lens 2*a*, 2*b*, so that the projected image IP is reflected according to the ocular axis A-A.

The angle β with respect to the ocular axis A-A will be determined by the relative inclinations of the other optical components of the system and of the display.

This angle may be obtained in two ways: by means of a lens of a construction whose final result will be an inclined flat mirror located inside the glasses lens 2*a*, 2*b*, or by means of a part of the glasses lens 2*a*, 2*b* made as an adaptive lens, or by a combination of the two methods.

Figure 3:
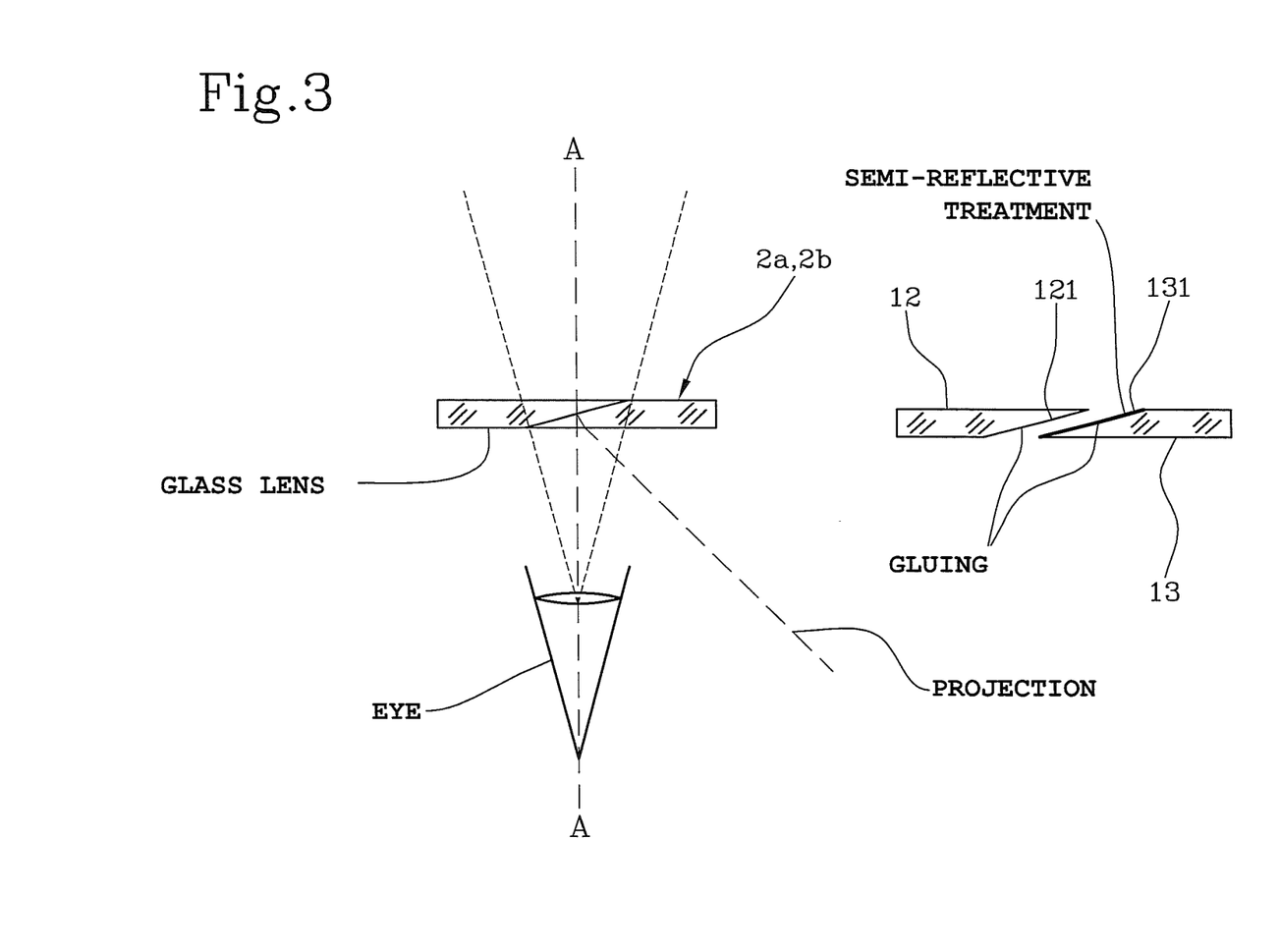
FIG. 3 shows a reflection system according to the invention.

In the first method, a special flat glasses lens is needed, formed in its turn by two flat lenses glued together (FIG. 3).

In particular, according to the invention, a lens 2a, 2b comprises a flat lens comprising in its turn two lenses 12, 13 coupled so that one of respective coupling faces 121, 131 is treated with a reflective surface coating 130.

The gluing of these two lenses must be performed using a glue whose refractive index is similar to that of the material used for the lenses so that once it has become clear the gluing is not visually detectable in the single lens thus obtained. The user's perception will thus be of a single lens.

The reflective surface coating 130 is configured for reflecting a narrow band (B) of the visible spectrum.

This narrow band B preferably coincides with that of the image IE emitted by the display 3.

According to the invention, this narrow band (B) comprises the range of frequencies of the visible between 20 and 50 nm.

Such a narrow band B is determined starting from an emission band of LED light, i.e. about 20-30 nm, and also considering fluctuations depending on the operating temperature of the LED.

In other words, on the gluing side of the glasses lenses a semi-reflective surface coating is formed which reflects only a very narrow band of the visible spectrum, therefore a single "colour", which will be that emitted by the display 3.

The final effect obtained (see drawing) is a glasses lens with inside it a partially transparent mirror.

Only this semi-reflective zone will be used for the reflection of the image projected by the display 3, i.e. the image of the display 3 is projected onto the glasses lens 2a, 2b only in the zone with the surface coating, and by this into the user's eye along an inclined direction of the second predefined angle β with respect to the direction of the ocular axis A-A.

In the second method, the glasses lens 2a, 2b must be made as a single lens in which a part of the lens only will be made as an adaptive lens, in other words a surface coating (or masking) on a part of the lens will make it possible to make part of the glasses lens as an inclined flat mirror.

Preferably, the flat mirror of the lens 2a, 2b is configured for receiving a narrow-band semi-reflective coating, so as to reflect into the eye of the user the image IE coming from the display 3.

In other words, the narrow-band semi-reflective coating for reflecting the image coming from the display 3 into the eye of the user must be located in the part of the glasses lens made as an inclined flat mirror.

Advantageously, according to the invention, the flat mirror is configured for receiving a narrow-band semi-reflective coating only in a part of the at least one glasses lens 2a,2b facing towards the display 3.

The technical effects of the disclosed solution are multiple:
- the user can have the image from the display 3 superimposed on the real scene at the centre of the vision so that they do not have to turn the pupils upwards or downwards or to the right or to the left to see it because this would divert their attention from the scene in front of them which they are observing, and from what they are doing;
- filters are no longer necessary to limit the luminosity of the external scene which in conditions of strong illumination makes the image coming from the display 3 not visible or visible with difficulty.

The current solutions provide external filters which can be attached, or dark glasses lenses, and the user is therefore for all practical purposes wearing sunglasses.

The need to use the glasses in all light conditions forces the use of filters that are not too strong, which however make using the glasses in a low-light environment difficult because the intensity of the light coming from the external scene becomes low; while on the other hand, when the light of the sun is strong, the screening capacity of the filters is not usually sufficient to easily see the superimposed image from the display, which does not appear or appears insufficiently bright compared with the scene from outside.

Using the method described above, i.e. a narrow-band semi-reflecting mirror on one zone only of the glasses lens, the contrast between external scene and projected image will be increased, and vision will be facilitated by the difference in colour. This will make it possible to use clear lenses but to have a bright image superimposed both in the case of high luminosity and in the case of poor light.

The image will form therefore at the centre of the scene observed by the user and will be bright and well-defined in all luminosity conditions, thus allowing the user to perform the normal activities of life such as driving a car, walking and so forth both in the daytime and at night.

This solution represents a method of eliminating undesired reflections in the glasses lens which has a semi-reflective coating to avoid reflecting into the eye part of the scene behind the person.

For example, while wearing the glasses and driving a car, they must not be dazzled at night by the headlights of a car coming up behind them.

This method provides that only the part of the glasses lens which is looking at the display has a semi-reflecting area as described above. This ensures that only the images from the display are reflected into the operator's eye. If the display is switched off, the conformation of the temple of the glasses itself protects the user from undesired reflections.

Advantageously, according to the invention the optical system 4a,4b is configured for allowing variation in the position of its components in order to vary the focal length of the system so as to compensate for the visual defects of the user.

The technical effect achieved is to permit the wearing of the glasses 1 even by people who wear optical glasses.

The first part of the solution concerns the possibility of moving one or more of the components of the system for enlarging or collimating the image so as to vary the focal length of the system and therefore the divergence or convergence of the optical beam which the optical system conveys from the display towards the eye and thus to compensate for the visual defects of the user.

The possibility will be provided of self-adjustment of one or more of these optical components by means of manual adjustment by micrometer screw; in other words, by fine adjustment of one or more of the optical components of the system the visual defect will be compensated for and the user will have the possibility of having the superimposed image from the display sharp and well-delineated.

The second part concerns the possibility of inserting the glasses lens 2a,2b described above into the optical path so that it is positioned on the glasses frame in a position closer to the eye than the optical lens of the person who habitually wears corrective glasses.

By combining the two solutions described above the glasses of the invention will be able to be worn and used even by people with visual defects.

In other words, the optical system 4a,4b is configured for allowing variation in the position of its components in order to vary the focal length of the system so as to compensate for visual defects of the user.

Preferably, the augmented reality glasses 1 comprise a battery pack 50 of rechargeable batteries which supply all the electronic components of the glasses.

Preferably, the augmented reality glasses 1 comprise a Bluetooth transmitter/receiver 30 which makes it possible to connect to a mobile phone.

Preferably the augmented reality glasses 1 comprise an electronic control card 11 which will manage the various electronic and opto-electronic components integrated into the glasses.

According to the invention, these components are managed by the processing unit 10.

In other words, the processing unit 10 comprises operative modules 103, 104, 105 configured for managing the interfacing of these components with the glasses 1 of the invention so as to show suitable control parameter values Pi on the display 3.

The invention claimed is:

1. Augmented reality glasses comprising:
   a frame which supports a glasses lens and is completed by two supporting temples of the glasses, wherein said lens comprises a flat lens comprising in its turn two lenses coupled so that one of respective coupling faces is treated with a reflective coating;
   wherein said frame is associated with:
   a miniaturized display configured for emitting images away from a plane comprising the longitudinal extension of the glasses lens and in a direction which substantially coincides with the directrix of a supporting temple in the prevalent direction of extension of the supporting temple;
   an optical system configured for:
      receiving images from said display;
      processing said images so as to create processed images;
      addressing these processed images in said direction away from said plane comprising the longitudinal extension of the glasses lens;
   reflection means configured for receiving said processed images and reflecting them at a first predefined angle towards said glasses lens, so as to project said processed image onto said glasses lens, thereby defining a projected image;
   wherein the lens is made to reflect the image coming from the display so that the centre of this image is at the centre of the glasses lens and is reflected along the ocular axis, enabling the eye to perceive it at the centre of the observed scene;
   said at least one lens being configured for reflecting said projected image in a direction of the ocular axis according to a second predefined angle with respect to the direction of incidence of said processed images onto said glasses lens.

2. The glasses according to claim 1 wherein said display is a transmissive display.

3. The glasses according to claim 2 comprising an LED configured for back-lighting said display.

4. The glasses according to claim 1 wherein said display is a reflection display.

5. The glasses according to claim 4 wherein said optical system is configured for concentrating solar rays onto said display.

6. The glasses according to claim 5 wherein said optical system comprises at least one lens.

7. The glasses according to claim 1 comprising a luminosity sensor configured for measuring values of luminous intensity.

8. The glasses according to claim 1 comprising a processing unit configured for processing input data to said glasses to generate corresponding images on said display.

9. The glasses according to claim 8 wherein said processing unit comprises an adjustment module configured for producing an image for said display as a function of said luminous intensity.

10. The glasses according to claim 9 wherein said processing unit comprises a selection module configured for selecting the display mode of said display as a function of said luminous intensity so as to produce an image for said display as a function of said luminous intensity.

11. The glasses according to claim 1 wherein said lens comprises on a part thereof a surface coating configured to make a part of the glasses lens as an inclined flat mirror.

12. The glasses according to claim 1 wherein said optical system is configured for a variation in the position of its components in order to vary the focal length of the system so as to compensate for the visual defects of the user.

* * * * *